Sept. 28, 1965 J. A. MAS 3,209,230
BATTERY CHARGER
Filed Sept. 19, 1962 5 Sheets-Sheet 1
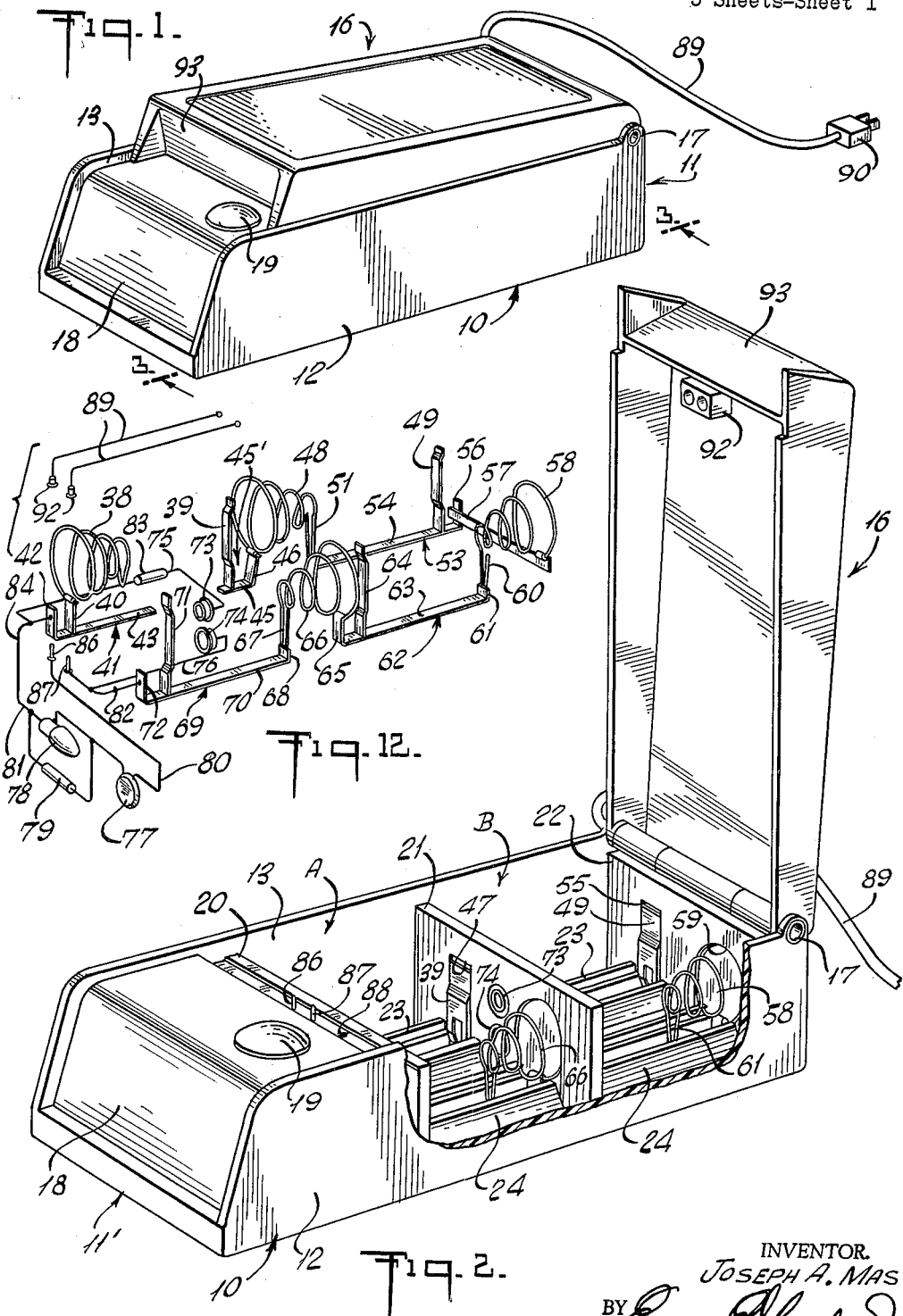
INVENTOR.
JOSEPH A. MAS
BY
ATTORNEY

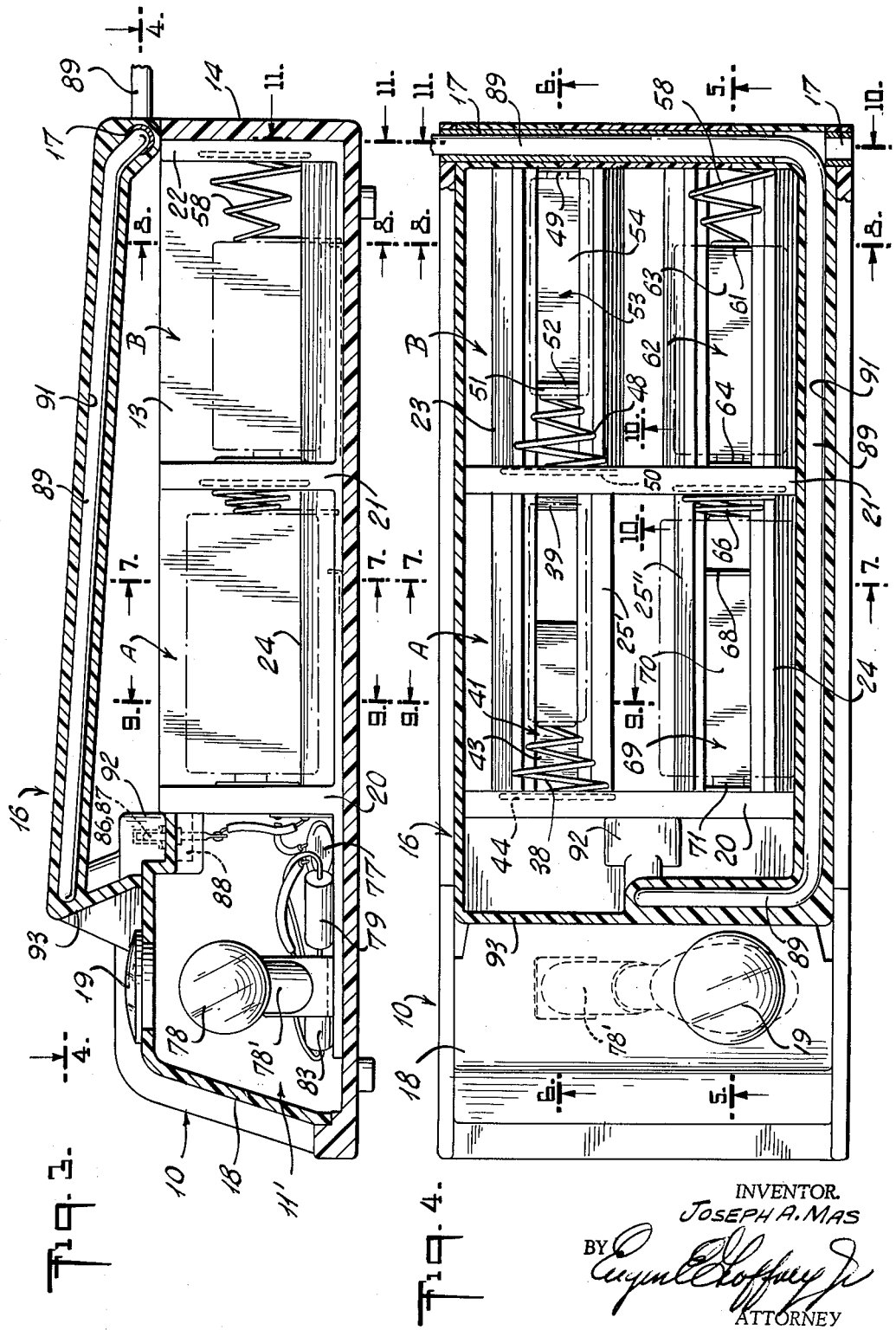

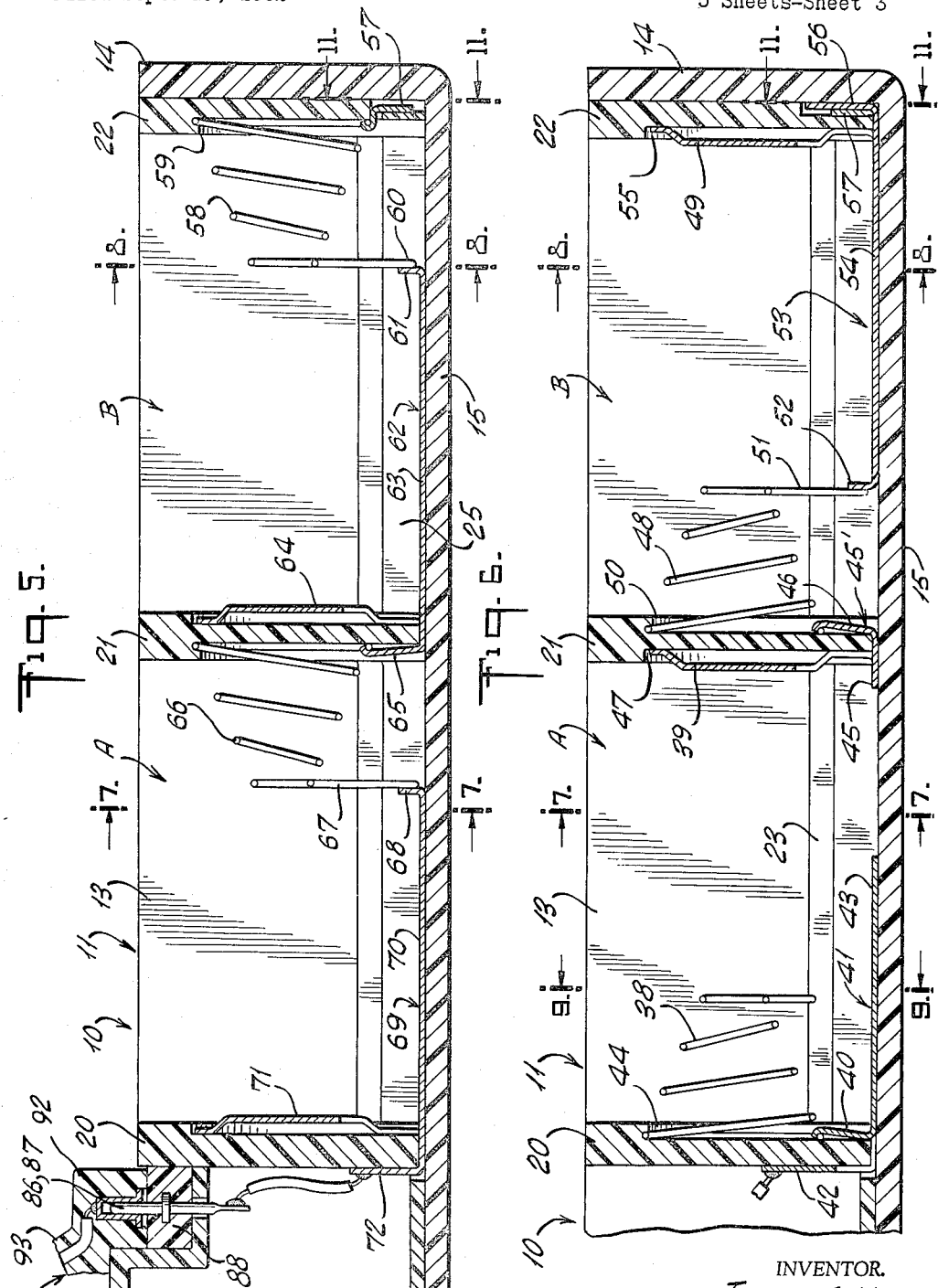

Sept. 28, 1965  J. A. MAS  3,209,230
BATTERY CHARGER
Filed Sept. 19, 1962  5 Sheets-Sheet 4
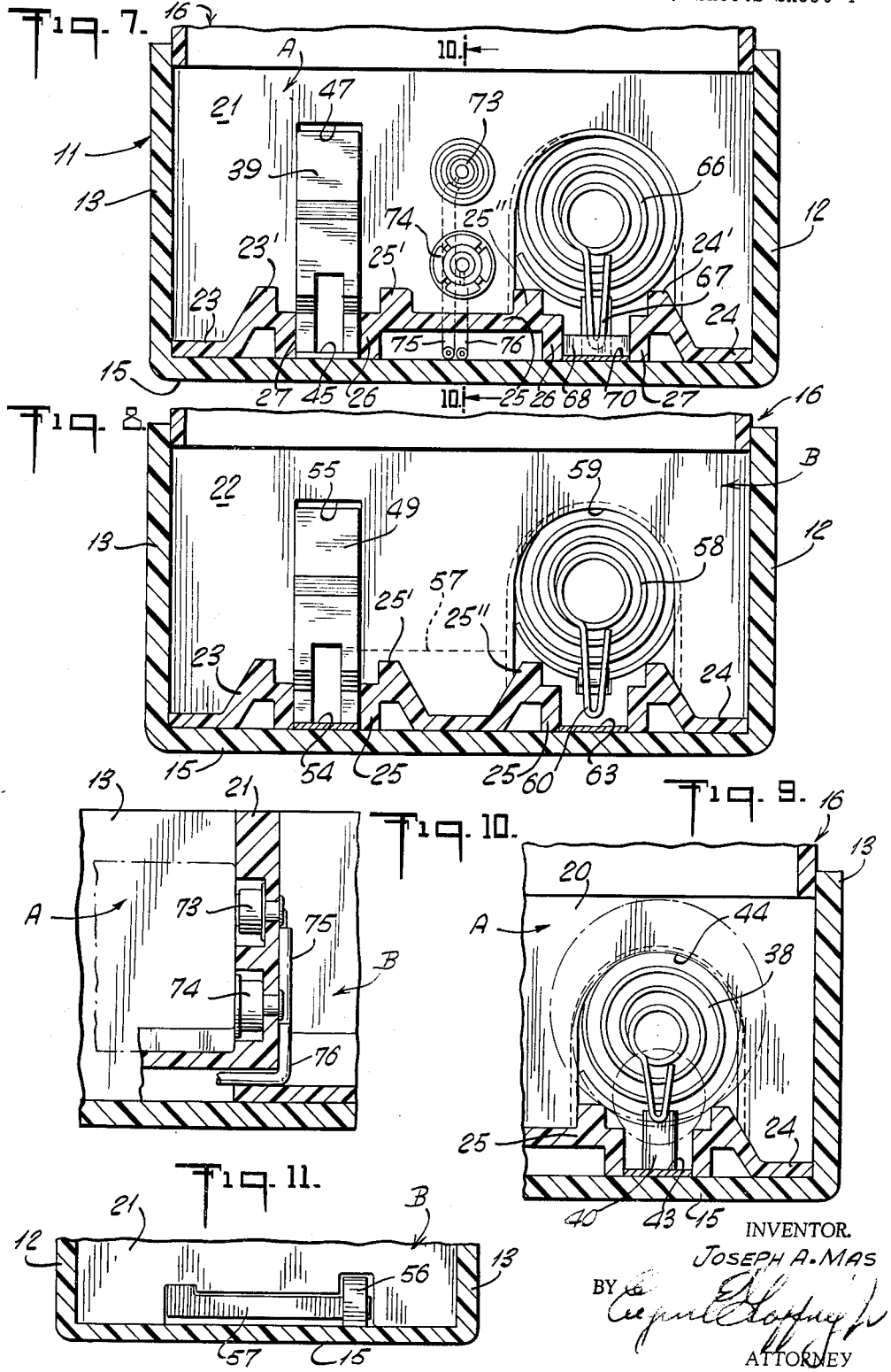
INVENTOR.
JOSEPH A. MAS
BY
ATTORNEY

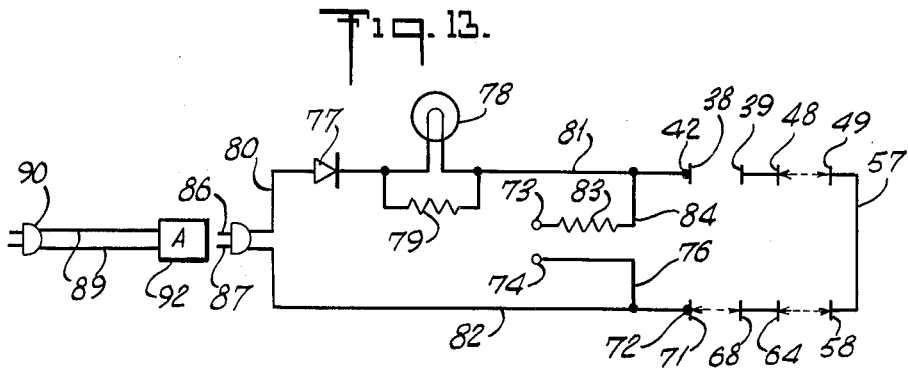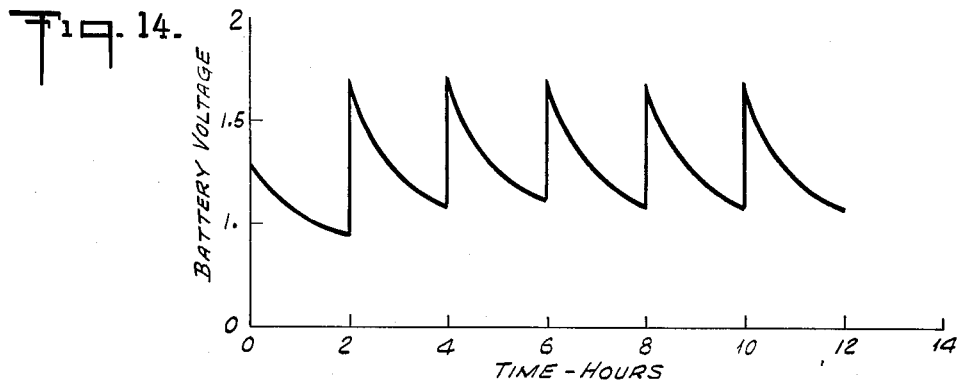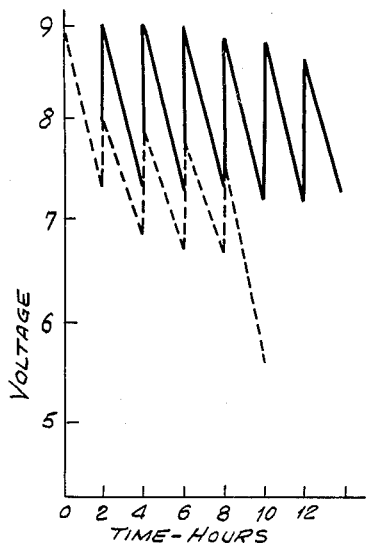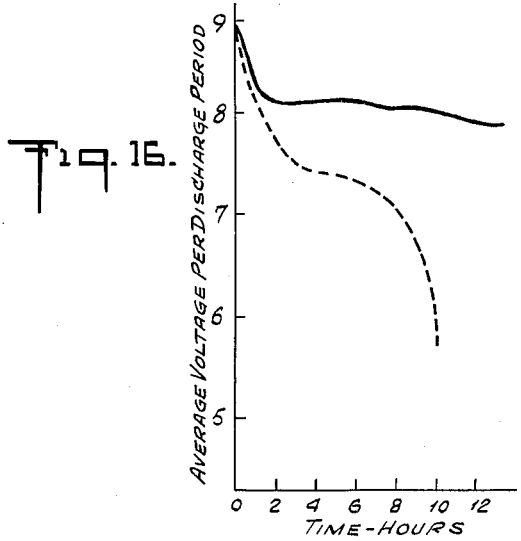

United States Patent Office 3,209,230
Patented Sept. 28, 1965

3,209,230
BATTERY CHARGER
Joseph A. Mas, Woodbury, N.Y., assignor to Dynamic Instrument Corp., a corporation of New York
Filed Sept. 19, 1962, Ser. No. 224,868
3 Claims. (Cl. 320—2)

This invention relates to battery chargers and more specifically to a novel and improved charger for small batteries such as those used for powering small electrical devices such as radios, motors and the like.

While it is generally well recognized that wet batteries such as lead-acid cells, silver-cadmium cells and the like may be recharged regularly, it has also been found that it is possible to recharge the so-called dry battery or carbon-zinc cell many times and obtain appreciably more power from the battery after a recharge than the battery afforded initially. With this invention, carbon-zinc cells, as well as other forms of miniature batteries, may be easily and safely recharged, and the useful life of the cell can be increased mnay times.

Another object of the invention resides in the provision of a novel and improved charger which affords means for charging one or more dry cells and is characterized by its simplicity, ease of operation, safety and relatively low cost.

Still another object of the invention resides in the provision of a novel and improved charger for batteries.

The above and other objects and advantages of the invention will become more apparent from the following description and accompanying drawings forming part of this application.

In the drawings:

FIGURE 1 is a perspective view of a charger in accordance with the invention.

FIGURE 2 is a perspective view of the charger in FIG. 1 prepared for reception of the batteries to be charged and with portions cut away to expose certain elements of the structure.

FIGURE 3 is a cross-sectional view of the charger in accordance with the invention taken along the line 3—3 of FIG. 1.

FIGURE 4 is a cross-sectional view of FIG. 3 taken along the line 4—4 thereof.

FIGURE 5 is an enlarged cross-sectional view of FIG. 4 taken along the line 5—5 thereof.

FIGURE 6 is an enlarged cross-sectional view of FIG. 4 taken along the line 6—6 thereof.

FIGURE 7 is a cross-sectional view of FIGS. 3 and 4 taken along the lines 7—7 thereof.

FIGURE 8 is a cross-sectional view of FIGS. 3 to 6 inclusive taken along the lines 8—8 thereof.

FIGURE 9 is a fragmentary cross-sectional view of FIG. 6 taken along the line 9—9 thereof.

FIGURE 10 is a fragmentary cross-sectional view of FIG. 4 taken along the line 10—10 thereof.

FIGURE 11 is a fragmentary cross-sectional view of FIG. 5.

FIGURE 12 is a perspective view of the battery connectors and electrical circuitry embodied in the structures shown in FIGS. 1 through 11 inclusive.

FIGURE 13 is a circuit diagram of the charger in accordance with the invention.

FIGURES 14 through 16 are graphic illustrations showing the performance of batteries periodically charged with the apparatus as illustrated in FIGS. 1 to 13 inclusive.

The charger in accordance with the invention may be utilized for charging a variety of batteries, as, for instance, the conventional type "flashlight" batteries generally referred to as "C" and "D" and penlite cells, as well as batteries utilizing snap-type clips for the reception of a connector when used in connection with equipment to be powered thereby, such as miniature radios and the like. The charger will accommodate one to four of the so-called "flashlight" batteries of any size, the batteries being automatically connected in series merely by placing them in position within the charging compartment. It will become apparent, however, that chargers may be arranged for any number of batteries, and batteries may be charged either in series or parallel arrangements utilizing this invention.

Referring now to the drawings, the charger is generally denoted by the numeral 10 and comprises a casing or housing 11 having side walls 12 and 13, a rear wall 14, a bottom wall 15 and a cover 16. The cover 16 is hinged by a suitable pin 17 to rear portions of the side walls 12 and 13, and pivots upwardly to an open position as shown generally in FIG. 2. The cover in the closed position terminates at a point spaced from the front edge of the side walls 12 and 13, and the space forwardly of the front edge of the cover 16 and between side walls 12 and 13 is closed by a fixed cover 18 having a transparent or translucent window 19 through which an incandescent lamp may be observed when the charger is in operation.

The housing portion 11 is provided with a pair of battery-receiving compartments, "A" and "B," formed by internal partitions 20 and 21 and a plate or wall 22 lying against the rear wall 14. The bottom of each battery compartment is provided with longitudinally disposed supports for accommodation of the electrical elements and support for the larger type cells that may be charged by this device. The configuration of these longitudinally disposed structures within each compartment may be observed more clearly in FIGS. 7 and 8. They comprise outer elements 23 and 24 and a central element 25. The central element is generally in the shape of an inverted channel having upwardly extending runner portions 25' and 25" and substantially vertical side walls 26. The side elements 23 and 24, which are substantially identical, have upwardly extending runner portions 23' and 24' and vertical side walls 27 in spaced relationship to the vertical side walls 26 of the central element 25. The runners 23', 25' and 24', 25" support the larger "C" and "D" cells when placed in position for charging. The smaller cells may be supported by the spring loaded contacting elements which provide firm contact with the battery notwithstanding the diameter or length of the battery.

The battery contacting elements within the compartments "A" and "B" are shown more clearly in FIG. 12. The battery contacts for the battery disposed in the left side of compartment "A" as illustrated in FIG. 2 comprises a spring 38 and a fixed contact 39. The spring 38 is supported by a vertical bracket 40 which is secured to an L-shaped bracket 41. The vertical bracket member 40 is spaced from the leg 42 of the bracket 41, while the leg 43 lies between the longitudinal elements 25 and 24 as will be observed in FIG. 9. The wall 20 fits between the elements 40 and 42, and is recessed as indicated at 44 in FIG. 4 to receive and center the spring 38. The contact element 39 is carried by an L-shaped bracket member 45' having legs 45 and 46. The wall 21 is recessed at 47 as shown in FIGS. 2 and 7 to receive the end portions of the bracket 39 while the center portion extends beyond the surface of the wall 21 to provide good contact with the battery.

It will be observed that the spring 38 and the contact 39 are nonshorting, and, as will become evident, one battery must be placed in compartment "A" between the contacts 38 and 39 in order to perform the charging operation.

The contacts for the battery in the left side of compartment "B," as illustrated in FIG. 2, include a spring 48 and a fixed contact 49. The spring 48 is carried by the leg 46 of the bracket 45', and the spring lies in a recess 50 of the wall 21 as indicated in the figure. The forward end of the spring 48 carries a downwardly extending electrical contacting finger 51 which normally electrically contacts an upwardly extending tab 52 on the left-hand end of the bracket member 53. The base 54 of the bracket member 53 lies in the channel formed by the longitudinal elements 23 and 25 as observed in FIG. 8 and extends beneath the rear wall 22. The bracket 49 is secured to the leg 54 with bracket 53 and engages a receiving recess 55 in the wall 22. The upwardly extending leg 56 of the bracket 53 carries a transverse bar 57 to which the spring 58 in the right-hand side of compartment "B" is secured. The spring 58 sits within the recess 59, as may be observed in FIG. 2, and the forward end of the spring includes a downwardly extending portion 60 for engaging the tab 61 of bracket member 62. The base 63 of the bracket 62 lies between the longitudinal elements 25 and 24 of compartment "B" and extends beneath the wall 21. The contact 64 is secured to the leg 63 of bracket 62 and is retained in a recess in the backside of wall 21 as in the case of the other fixed contacting elements. It will be observed that the spring element 60 normally contacts the tab 61 to connect the contacts 64 and 68 as in the case of the battery contacting elements in the left side of compartment "B."

The forward end of leg 63 of bracket 62 has an upwardly extending member 65 carrying a spring 66. This spring has a downwardly extending element 67 which electrically contacts the tab 68 on bracket member 69 with the leg 70 of that bracket member lying between the longitudinal elements 24 and 25, as viewed in FIG. 7. The fixed contact 71 is retained in a recess on the backside of wall 20 as in the case of the previous brackets, and the forward end of the leg 70 of bracket 69 has an upwardly extending element 72 which lies on the forward side of the wall 20.

It will therefore be observed that the battery contacts in the left side of compartment "A" as shown in FIG. 2 are nonshorting, while the other three sets of battery contacting elements are of the shorting type. In this way, a single battery may be charged in the left-hand portion of compartment "A," and if two or more batteries are to be charged, it is necessary that one battery be placed between the nonshorting contacts and the other battery may then be positioned in any of the remaining battery receiving positions. FIGS. 3 and 4 show the manner in which conventional batteries of different sizes are installed in charging positions in the compartments.

In addition to charging conventional batteries of cylindrical configuration with contacts on each end thereof, means are provided for charging conventional nine-volt batteries of the type generally used in transistor radios and the like, having a pair of spring contacts on one end of the battery. For this purpose, male and female contacts 73 and 74 are recessed in the forward side of the wall 21 so that a nine-volt battery can be received in the center of compartment "A." The leads 75 and 76 extend downwardly from the contacts 73 and 74 and pass through the channel formed beneath the central longitudinal element 25 lying within compartment "A."

The electrical charging circuit is shown in FIGS. 12 and 13 and includes a rectifier 77, an incandescent lamp 78 in series with the rectifier and a resistor 79 bridging the lamp 78. Electric current is fed to the rectifier via the lead 80 and after passing through the lamp 78 and resistor 79 is connected to the terminal 42 by lead 81. The return circuit from connector 72 is effected by lead 82. Thus, by applying energy to the leads 80 and 82, a predetermined charge will be applied to the batteries as determined by the characteristics of the lamp 78 and the resistor 79. In addition, the lamp 78 is mounted in a socket 83 in the forward portion 11' of housing 11 and immediately beneath the transparent or translucent window 19. The lamp will therefore act as a pilot light to indicate that the charge is in progress and at the same time, it will function to limit the maximum charge that may be applied to the batteries because of the nonlinear characteristic of an incandescent filament. The nine-volt battery contacts 73 and 74 are connected in parallel with the charging circuit for the batteries. More specifically, the contact 73 is connected through a current-limiting resistor 83 and lead 84 to the lead 81, while the contact 74 is connected directly to the lead 82 by means of the lead 76.

The leads 80 and 82, through which energy is fed to the charging circuit, are connected to terminals 86 and 87 of the connector 88 which is mounted just forward of the wall 20 as may be observed in FIGS. 2 and 3. The line cord 89 having a plug 90 for insertion into an energized receptacle enters the cover 16 through the hinge and is carried within an opening 91 in the cover and connects to a female receptacle 92 carried on the forward wall 93 of the cover 16. When the cover 16 is closed, as shown in FIG. 3, energy is applied to the terminals 86 and 87 and of course to the charging circuit. When the cover is open, energy is removed from the charging circuit, thus avoiding any possibility of danger to the user by reason of the fact that the charging circuit is not completely isolated from the line.

For charging conventional 1½ volt carbon-zinc cells, it has been found that a rate of charge of the order of 50 to 100 milliamperes is desirable. For this purpose, a seven-watt incandescent lamp is used as the lamp 78 and a resistor is connected in parallel with the lamp to provide a current of 100 mille through the batteries when they were in a discharged state. Tests on batteries charged in accordance with the invention have indicated that while a 1½ volt, Type D cell will provide approximately two hours of operation under a 500 milliampere load and a terminal voltage of .98 volt. Upon recharging the batteries for a period of about eight hours following the discharge period, it was found that the initial voltage of the batteries was considerably higher and that after a two-hour discharge period at 500 milliamperes, the voltage fell only to 1.02 volts. Thus, while the new battery provided approximately .7 ampere hour of energy, after the first charge, more than .9 ampere hour was obtained. After the second charge, over one ampere hour was obtained. These results are shown in FIG. 14 of the drawings.

Thus, with the utilization of the charger in accordance with the invention, conventional carbon-zinc batteries can be recharged a plurality of times and normal batteries have been found to be rechargeable ten to fifteen times before deterioration occurs that prevents further charging.

In the case of nine-volt batteries, such as the Eveready, No. 216, the broken line curve in FIG. 15 indicates a maximum useful life of the battery of eight to ten hours, provided, however, that the battery is rested for at least fourteen hours following each two-hour period of use with a 500 ohm load. When the battery is charged for eight hours, after each two-hour period of use, the voltage varies as shown by the solid curve of FIG. 15. Actual tests have indicated that the conventional nine-volt batteries may be charged as many as twenty or thirty times and the charging rate is preferably maintained at about fifteen to twenty milliamperes. In FIG. 16, the dotted curve shows an average battery voltage from the conventional nine-volt battery feeding a 500 ohm load which is used at a rate of two hours on and fourteen hours off. The solid curve represents the average battery voltage when the battery is used for two hours under equivalent conditions and then charged for approximately eight hours.

While only one embodiment of this invention has been illustrated and described, it is understood that alterations, modifications and changes may be made without departing from the true scope and spirit thereof as defined in the appended claims.

What is claimed is:

1. A battery charger comprising a housing having bottom, side and end walls, at least two pairs of spaced battery engaging terminals, at least one terminal of each pair being of resilient material and biased in the direction of the other terminal of said pair, said one terminal of one pair including an element electrically connected thereto and contacting the other terminal of said one pair, said element being moved out of contact with the last said terminal upon insertion of a battery therebetween, a current controlled charging circuit within said housing and connected to a terminal of each pair and a connection between the remaining terminal of each pair, said housing including a cover hinged to said housing, said charging circuit including a line cord extending externally of said housing for connection to a source of electrical energy, a female connector carried by said cover and connected to said line cord, a male connector carried by said housing and connections between said male connector and said charging circuit, said charging circuit being energized upon closure of said cover to effect engagement of said male and female connectors.

2. A battery charger according to claim 1 wherein said charging circuit includes a series connected rectifier and incandescent lamp and said housing includes a window for viewing the light emitted by said lamp during the charging operation.

3. A battery charger comprising an elongated housing having at least two battery receiving compartments and a charging circuit compartment, a cover hinged to said housing and overlying said battery receiving compartments, a compartment closure closing the charging circuit compartment, a window in said closure, at least two pairs of spaced terminals in each battery compartment, each pair of spaced terminals including a spring biased in the direction of the other terminal of the pair, connections between said pairs of terminals to form a series string, individual means associated with each pair of contacts in one battery compartment and one pair of contacts in the other battery compartment to normally short circuit the pairs of contacts one to the other, said individual means being rendered inoperative upon insertion of a battery between the contacts, a cable extending from the charger for the supply of energy, a charging circuit including a series connected lamp and rectifier connected to said cable and to said pairs of spaced terminals for series charging of batteries in said compartments, said lamp being positioned adjoining said window to indicate operation of said charger and the state of charge of said batteries, and said cover and housing having an electric interlock to disconnect said cable from said charging circuit when the cover is opened.

References Cited by the Examiner

UNITED STATES PATENTS

| | | | |
|---|---|---|---|
| 705,919 | 7/02 | Gill | 136—173 |
| 911,522 | 2/09 | Patterson | 136—173 |
| 2,036,547 | 4/36 | Siemon | 320—4 |
| 2,505,614 | 4/50 | Gilbert et al. | 320—4 |
| 2,588,962 | 3/52 | Carlson | 320—4 |
| 2,780,766 | 2/57 | Hedding et al. | 320—4 |

LLOYD McCOLLUM, *Primary Examiner.*